US009499918B2

United States Patent
Sandala et al.

(10) Patent No.: US 9,499,918 B2
(45) Date of Patent: Nov. 22, 2016

(54) METHOD FOR COATING PIPE SEGMENTS

(71) Applicant: PPG Industries Ohio, Inc., Cleveland, OH (US)

(72) Inventors: Michael Sandala, Pittsburgh, PA (US); Lorraine Hsu, Pittsburgh, PA (US); Craig Wilson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 102 days.

(21) Appl. No.: 14/223,181

(22) Filed: Mar. 24, 2014

(65) Prior Publication Data

US 2015/0267856 A1  Sep. 24, 2015

(51) Int. Cl.
| | |
|---|---|
| *F16L 58/10* | (2006.01) |
| *C25D 9/02* | (2006.01) |
| *C25D 7/04* | (2006.01) |
| *C09D 5/44* | (2006.01) |
| *C25D 13/14* | (2006.01) |
| *E03B 7/00* | (2006.01) |

(52) U.S. Cl.
CPC .............. *C25D 9/02* (2013.01); *C09D 5/4411* (2013.01); *C09D 5/4473* (2013.01); *C09D 5/4476* (2013.01); *C25D 7/04* (2013.01); *C25D 13/14* (2013.01); *E03B 7/006* (2013.01); *F16L 58/1009* (2013.01); *F16L 58/1054* (2013.01)

(58) Field of Classification Search
CPC .......... C25D 9/04; C25D 7/04; C25D 13/14; C09D 5/4411; C09D 5/4473; C09D 5/4476; E03B 7/006; F16L 58/1009; F16L 58/1054
See application file for complete search history.

(56) References Cited

U.S. PATENT DOCUMENTS

| | | | |
|---|---|---|---|
| 3,159,558 A | | 12/1964 | McCoy |
| 5,356,679 A | * | 10/1994 | Houis ............... C23C 28/00 138/143 |
| 2007/0015873 A1 | | 1/2007 | Fenn |
| 2013/0306477 A1 | | 11/2013 | Hsu et al. |
| 2013/0306478 A1 | | 11/2013 | Hsu et al. |

FOREIGN PATENT DOCUMENTS

WO   WO2013/119686 A1   8/2013

OTHER PUBLICATIONS

Lawly, Bisphenol A: Food Safety Watch, Jan. 2013, www.foodsafetywatch.org/factsheets/bisphenol-a/.*

* cited by examiner

*Primary Examiner* — Kishor Mayekar
(74) *Attorney, Agent, or Firm* — William J. Uhl

(57) ABSTRACT

A method for coating a segment of pipe is disclosed. The method comprises applying by electrodeposition a coating composition to the segment of pipe wherein the coating composition comprises:

(i) a (meth)acrylic polymer dispersed in aqueous medium prepared by polymerizing in the presence of a cationic salt group containing polymeric dispersant a polymerizable ethylenically unsaturated monomer composition comprising a mixture of ethylenically unsaturated monomers at least one of which contains at least two ethylenically unsaturated groups per molecule;
  (ii) an electrodepositable cationic resinous vehicle containing active hydrogen groups; and
  (iii) a curing agent reactive with the active hydrogen groups.

14 Claims, No Drawings

METHOD FOR COATING PIPE SEGMENTS

FIELD OF THE INVENTION

The present invention relates to a method of coating a segment of pipe used to convey potable water. More particularly, the invention relates to applying to the surfaces of the pipe an anti-corrosive coating by the process of electrodeposition.

BACKGROUND OF THE INVENTION

Petroleum bitumen-based coatings are known to coat the pipes used to convey potable water. The thickness of such coatings varies, especially at joints where segments of pipes are joined together for assembly. This difference in thickness is undesirable because it can lead to poor sealing and potential leakage at the joint. To overcome this problem, it is known to apply a protective coating by the process of electrodeposition that applies a coating of uniform thickness across the entire pipe segment. However, for optimum corrosion resistance, it was believed the electrodeposition composition needed to be formulated with an epoxy resin derived from bisphenol A. However such compositions are problematic because bisphenol A has been reported as being an estrogenic material. Therefore, its uses in pipes conveying potable or drinking water is perceived as being harmful.

SUMMARY OF THE INVENTION

The present invention provides for a method of coating pipe segments with an electrodeposition composition that has excellent corrosion resistance and can be formulated such that it is substantially free from bisphenol A and derivatives thereof. Specifically, the invention provides the following:

A method comprising applying by electrodeposition a coating composition to the segment of pipe wherein the coating composition comprises:
 (i) a (meth)acrylic polymer dispersed in aqueous dispersion medium prepared by polymerizing in the presence of a cationic salt group containing polymeric dispersant a polymerizable ethylenically unsaturated monomer composition comprising a mixture of ethylenically unsaturated monomers at least one of which contains at least two ethylenically unsaturated groups per molecule;
 (ii) an electrodepositable cationic resinous vehicle containing active hydrogen groups; and
 (iii) a curing agent reactive with the active hydrogen groups.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The pipe segments of the invention are typically made from ferrous metal such as cast iron or steel. For conveying potable or drinking water, the internal diameters of the pipe segment are typically from 10 to 100 centimeters (cm). The pipes usually come in segments such as linear and non-liner segments such as elbow-shaped segments. The segments typically have lengths of 10 to 30 cm. Segments are joined together by jam fitting in which one end of a pipe section is tapered and fits into a collar of slightly larger dimensions of the pipe to be connected forming a seal between the inner tapered surface and the outer collar surface.

As indicated, certain embodiments of the present invention are directed to electrodepositable coating compositions. As used herein, the term "electrodepositable coating composition" refers to a composition that is capable of being deposited onto an electrically conductive substrate under the influence of an applied electrical potential.

The coating compositions used in the present invention comprise a non-ionic (meth)acrylic polymer dispersed in aqueous medium that is a polymerization product of a polymerizable ethylenically unsaturated monomer composition. The term "acrylic" includes acrylic acid and derivatives thereof such as esters thereof, so-called acrylates. The terms "(meth)acrylic" or "methacrylate" are intended to cover both acrylic/acrylate and methacrylic/methacrylate. Besides water, the dispersion medium also comprises a cationic salt group-containing polymeric dispersant to disperse the non-ionic (meth)acrylic polymer.

As used herein, the terms "cationic salt group containing polymeric dispersant" and "polymeric dispersant" refer to cationic polymers comprising at least partially neutralized cationic groups, such as sulfonium groups and amine salt groups, that impart a positive charge. As used herein, the term "polymer" encompasses, but is not limited to, oligomers and both homopolymers and copolymers. "Resin" and "polymer" are used interchangeably. Typically, the polymeric dispersant has a Z average molecular weight (Mz) of 200,000 to 2,000,000.

In certain embodiments, the non-ionic (meth)acrylic polymer and/or the polymeric dispersant comprise active hydrogen functional groups. As used herein, the term "active hydrogen functional groups" refers to those groups that are reactive with isocyanates as determined by the Zerewitnoff test as is described in the JOURNAL OF THE AMERICAN CHEMICAL SOCIETY, Vol. 49, page 3181 (1927). In certain embodiments, the active hydrogen functional groups are derived from hydroxyl groups, primary amine groups and/or secondary amine groups.

In certain embodiments, the polymeric dispersant is itself a (meth)acrylic resin and is prepared, for example, by traditional free radical initiated polymerization techniques, such as solution polymerization techniques, wherein an ethylenically unsaturated polymerizable monomer composition containing one or more vinyl monomers is subjected to free radical initiated addition polymerization conditions, for example, by heating in the presence of a free radical initiator. Suitable polymeric dispersants and their preparation are described in US 2013/0306477, paragraphs [0016]-[0026], the portions of which are incorporated by reference.

The polymerizable ethylenically unsaturated monomer composition comprises a mixture of ethylenically unsaturated monomers at least one of which contains at least two or more polymerizable ethylenically unsaturated groups per molecule.

Non-limiting examples of monomers comprising two or more ethylenically unsaturated groups per molecule are poly(meth)acrylates including di(meth)acrylates, tri(meth)acrylates and/or tetra(meth)acrylates. Examples include ethylene glycol dimethacrylate, allyl methacrylate, hexanediol diacrylate, methacrylic anhydride, tetraethylene glycol diacrylate, tripropylene glycol diacrylate, pentaerythritol tetraacrylate, di-pentaerythritoltriacrylate, di-pentaerythritolpentaacrylate, ethoxylated trimethylolpropane triacrylate having 0 to 20 ethoxy units, and ethoxylated trimethylolpropane trimethacrylate having 0 to 20 ethoxy units. In certain embodiments, ethylenically unsaturated monomer(s) having more than one site of unsaturation are used in amounts of up to 10 percent by weight, such as 0.1 to 5 percent by weight, based on the total weight of the ethylenically unsaturated polymerizable monomer composition.

Examples of other polymerizable ethylenically unsaturated monomers that may be present in the polymerizable ethylenically unsaturated monomer composition include $C_1$-$C_{18}$ alkyl (meth)acrylates. Specific examples include, without limitation, methyl (meth)acrylate, ethyl (meth)acrylate, butyl (meth)acrylate, hexyl (meth)acrylate, octyl (meth)acrylate, isodecyl (meth)acrylate, stearyl (meth)acrylate, 2-ethylhexyl (meth)acrylate, isobornyl (meth)acrylate and t-butyl (meth)acrylate. In certain embodiments, the $C_1$-$C_{18}$ alkyl (meth)acrylates are used in an amount of up to 90 percent by weight, such as 30 up to 70 percent by weight, based on total weight of the ethylenically unsaturated polymerizable monomer composition, The polymerizable ethylenically unsaturated monomer composition may also comprise one or more substituted $C_1$-$C_8$ alkyl (meth)acrylates, for example, hydroxyalkyl esters, such as hydroxyethyl, hydroxypropyl, and/or hydroxybutyl (meth)acrylate. In certain embodiments, such monomer(s) are used in amounts of up to 20 percent by weight, such as 5 to 15 percent by weight, based on total weight of the ethylenically unsaturated polymerizable monomer composition.

The polymerizable ethylenically unsaturated monomer composition may comprise one or more vinyl aromatic compounds, such as styrene, alpha-methyl styrene, alpha-chloromethyl styrene and vinyl toluene. In certain embodiments, the vinyl aromatic compound(s) are used in amounts of up to 80 percent by weight, such as 20 to 60 percent by weight, based on the total weight of the ethylenically unsaturated polymerizable monomer composition.

The (meth)acrylic polymer can be prepared via polymerization of an ethylenically unsaturated polymerizable monomer composition in a dispersion medium comprising water and typically the previously described polymeric dispersant. In certain embodiments, the monomer composition is dispersed in the water in the presence of the polymeric dispersant and subjected to addition polymerization conditions by heating in the presence of a free radical initiator. The time and temperature of polymerization will depend on one another, the ingredients selected and, in some cases, the scale of the reaction. In certain embodiments, the polymerization is conducted at 40° C. to 100° C. for 2 to 20 hours.

The free radical initiator utilized for the polymerization may be selected from any of those used for aqueous latex polymerization techniques, including redox pair initiators, peroxides, hydroperoxides, peroxydicarbonates, azo compounds and the like.

The free radical initiator typically is present in an amount between 0.01 weight percent and 5 weight percent, such as between 0.05 weight percent and 2.0 weight percent, or, in some cases, between 0.1 weight percent and about 1.5 weight percent, based on the weight of the polymerizable ethylenically unsaturated monomer composition. A chain transfer agent that is soluble in the monomer composition, such as alkyl mercaptans, for example, tertiary-dodecyl mercaptan, 2-mercaptoethanol, isooctyl mercaptopropionate, n-octyl mercaptan or 3-mercapto acetic acid may be used in the polymerization of the polymerizable ethylenically unsaturated monomer composition. Other chain transfer agents such as ketones, for example, methyl ethyl ketone, and chlorocarbons such as chloroform can be used. In certain embodiments, the amount of chain transfer agent, if any, is from 0.1 to 6.0 weight percent by weight based on the weight of ethylenically unsaturated polymerizable monomer composition.

The coating composition used in the present invention typically comprises 2 to 50 weight percent, such as 20 to 35 weight percent, of the polymeric dispersant and from 50 to 98 weight percent, such as 65 to 80 weight percent by weight, of the polymerizable ethylenically unsaturated monomer composition, wherein these weight percentages are based on the total weight of the polymeric dispersant and polymerizable ethylenically unsaturated monomer composition.

Water is present in amounts of 40 to 90, such as 50 to 75 percent by weight, based on total weight of the dispersion medium.

Besides water, the dispersion medium can, in certain embodiments, contain some organic cosolvents. In certain embodiments, the organic cosolvents are at least partially soluble with water. Examples of such solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic cosolvents are, in certain embodiments, used in amounts less than 10 percent by weight, such as less than 5 percent by weight, based on total weight of the dispersion medium.

The electrodepositable coating compositions used in the present invention also comprise an electrodepositable cationic resinous vehicle that is different from the polymeric dispersant described above. Examples of such polymers, which are suitable for use in the present invention, include cationic salt group containing resins derived from polyglycidyl ethers, (meth)acrylic polymers, and polyesters, among others. Such polymers comprise active hydrogen groups, such as hydroxyl and primary and secondary amine groups, including combinations thereof.

Suitable cationic salt group containing polymers for use as component (ii) in the electrodepositable coating compositions used in the present invention also include, for example, cationic (meth)acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which are incorporated herein by reference.

The cationic salt group can be an amine salt group and/or a sulfoniurn salt group. Typically, the electrodepositable cationic resinous vehicle is prepared in organic solvent, at least partially neutralized with acid and inverted into aqueous medium.

The electrodepositable coating compositions used in the present invention comprise a curing agent to react with the active hydrogen groups of the cationic salt group containing resinous vehicle. Non-limiting examples of suitable curing agents are blocked polyisocyanates, aminoplast resins and phenolic resins, such as phenolformaldehyde condensates including allyl ether derivatives thereof.

Suitable blocked polyisocyanates include blocked aliphatic polyisocyanates, aromatic polyisocyanates, and mixtures thereof. In certain embodiments, the curing agent comprises a blocked aliphatic polyisocyanate. Suitable blocked aliphatic polyisocyanates include, for example, fully blocked aliphatic polyisocyanates, such as those described in U.S. Pat. No. 3,984,299 at col. 1, line 57 to col. 3 line 15, this portion of which is incorporated herein by reference.

Examples of suitable aminoplast resins include those described in U.S. Pat. No. 3,937,679 at col. 16, line 3 to col. 17, line 47, this portion of which being hereby incorporated by reference. As is disclosed in the aforementioned portion of the '679 patent, the aminoplast can be used in combination with the methylol phenol ethers.

The coating compositions used in the present invention are formulated such that they are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions can also be substantially free and may be essentially free and may be completely free of bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above mentioned compounds, derivatives or residues thereof.

The resin solids content of the electrodepositable coating compositions used in the present invention is at least 1 percent by weight, such as from 5 to 40 percent by weight or 5 to 20 percent by weight resin solids. By resin solids is meant the non-volatile organic content of the composition, i.e., organic materials which will not volatilize when heated to 110° C. for 15 minutes and would exclude organic solvents.

In the coating compositions used in the present invention, the sum of the polymeric dispersant and the non-ionic (meth)acrylic polymer is typically from 5 to 50, such as 15 to 30 percent by weight. The electrodepositable resinous vehicle is typically from 25 to 90, such as 50 to 80 percent by weight. The curing agent is typically present in amounts of 5 to 52, such as 18 to 30 percent by weight. The percentage by weight is based on the total weight of resin solids in the coating composition.

The coating compositions used in the present invention may comprise a catalyst to catalyze the reaction between the curing agent and the active hydrogens. Suitable cure catalysts include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate). In certain embodiments, the cure catalyst comprises a cyclic guanidine as described in U.S. Pat. No. 7,842,762 at col. 1, line 53 to col. 4, line 18 and col. 16, line 62 to col. 19, line 8, the cited portions of which being incorporated herein by reference.

In some instances, a pigment composition, and if desired, various additives such as fillers, plasticizers, anti-oxidants, UV light absorbers, defoamers, fungicides, flow control agents, surfactants or wetting agents are included in the coating compositions used in the present invention. The pigment composition may be of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as the pigment-to-resin weight ratio. In the practice of the present invention, the pigment-to-resin weight ratio is sometimes within the range of 0.03 to 0.35, when pigment is used. The other additives mentioned above are usually in the dispersion in amounts of 0.01 to 3 percent by weight based on total weight of resin solids.

The coating compositions used in the present invention are deposited upon the pipe segment by placing the composition in contact with an electroconductive anode and the pipe segment acting as a cathode. Following contact with the composition, an adherent film of the coating composition is deposited on the pipe segment and a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, but is often between 50 and 500 volts. The current density is often between 0.5 ampere and 15 amperes per square foot and tends to decrease during electrodeposition indicating the formation of an insulating film.

Once the electrodepositable coating composition is electrodeposited over the pipe segment, the coated substrate is heated to a temperature and for a time sufficient to cure the electrodeposited coating on the substrate. Typically, the coated substrate is heated to a temperature ranging from 250° F. (121° C.) to 450° F. (232° C.). The curing time can be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes. The thickness of the resultant cured coating typically ranges from 15 to 50 microns.

Illustrating the invention are the following examples, which, however, are not to be considered as limiting the invention to their details. Unless otherwise indicated, all parts and percentages in the following examples, as well as throughout the specification, are by weight.

EXAMPLES

Definitions of Acronyms:

| Trade name/Abbreviation | Chemical | Supplier |
|---|---|---|
| Butyl Carbitol | 2-(2-butoxyethoxy)ethanol | Dow |
| Butyl Cellosolve | 2-Butoxyethanol | Dow |
| Dowanol PPH | 1-Phenoxy-2-propanol | Dow |
| Dowanol PNB | Propylene glycol butyl ether | Dow |
| MIBK | Methyl isobutylketone | |
| Surfynol XS139 | Surfactant mixture | Air Products |
| Vazo 67 | 2,2'-Azobis(2-methylbutyronitrile) | Dupont |

Example 1

Synthesis of Electrodepositable Cationic Resinous Vehicle

| Charge | Ingredient | Weight (In grams) |
|---|---|---|
| 1 | Dowanol PPH | 151.4 |
| | MIBK | 94.4 |
| | Deionized water | 8.0 |
| 2 | Ethyl acrylate | 324.0 |
| | Styrene | 248.0 |
| | Hydroxypropyl methacrylate | 80.0 |
| | Methyl methacrylate | 28.0 |
| | Glycidyl methacrylate | 120.0 |
| | t-Dodecyl mercaptan | 16.0 |
| | Vazo 67 | 24.0 |
| | MIBK | 49.6 |
| 3 | Vazo 67 | 4.7 |
| | MIBK | 6.0 |
| 4 | Urethane crosslinker* | 531.8 |
| | Butyl Cellosolve | 59.8 |
| | Dowanol PPH | 44.8 |
| 5 | Deionized water | 30 |
| 6 | Monoketimine** | 21.6 |
| | Methylethanolamine | 55.4 |
| | Butyl Cellosolve | 5.6 |
| 7 | Sulfamic acid | 29.7 |
| | Surfynol XS139 | 22.7 |
| | Deionized water | 1402.3 |
| 8 | Deionized water | 654.6 |
| 9 | Deionized water | 712.7 |

*Urethane crosslinker - Polymeric isocyanate blocked with Butyl Cellosolve and Butyl Carbitol.
**Monoketimine - A ketimine reacted with one equivalent of a ketone.

Charge 1 was added to a 4-necked flask fitted with a thermocouple, nitrogen sparge, and a mechanical stirrer. Under an N₂ blanket and agitation, the flask was heated to reflux. Charges 2 and 3 were added dropwise from an addition funnel over 150 minutes followed by a 30 minute hold. Charge 3 was added dropwise and held for 30 minutes followed by the addition of Charge 4. A Dean-Stark trap was fitted to the flask and the temperature was subsequently increased to 145° C. During the heating, Charge 5 was added drop wise while distillation was collected via the D-S trap. Continued to hold at 145° C. for two hours. After the hold, cooled to 110° C. and Charge 6 added to the reactor. After peak exotherm was generated, began a two hour hold. After the hold, cooled to 105° C. and reverse thinned into Charge 7 under agitation and held for 30 minutes. Charge 8 was added to the dispersion under agitation and held for an additional 30 minutes. A final Charge 9 was added, allowing the mixture to continue cooling to ambient temperatures.

The resinous material had a solids percent of 30.4%. GPC analysis to determine polymer Z average molecular weight showed a value of 43,050 and was done in DMF using polystyrene standards.

Example 2

Synthesis of Cationic Salt Group-Containing Polymeric Dispersant

| Charge | Ingredient | Weight (in grams) |
|---|---|---|
| 1 | Dowanol PNB | 26.2 |
| | Dowanol PM | 33.7 |
| | Butyl Cellosolve | 80.0 |
| | Deionized water | 5.6 |
| 2 | Ethyl acrylate | 141.4 |
| | Styrene | 24.8 |
| | Hydroxypropyl methacrylate | 55.8 |
| | Methyl methacrylate | 104.2 |
| | Glycidyl methacrylate | 37.2 |
| | Allyl methacrylate | 7.4 |
| | t-Dodecyl mercaptan | 3.7 |
| 3 | Vazo 67 | 9.3 |
| | Dowanol PNB | 11.9 |
| | Dowanol PM | 6.0 |
| | Methyl isopropyl ketone | 4.8 |
| 4 | Lupersol 7M50 | 7.4 |
| | Dowanol PNB | 6.0 |
| | Dowanol PM | 3.0 |
| 5 | Butyl Cellosolve | 32.4 |
| 6 | Thiodiethanol | 60.6 |
| | Lactic acid* | 17.8 |
| | Ricinoleic acid | 7.4 |
| | Deionized water | 13.4 |
| 7 | Deionized water | 2901.1 |
| 8 | Deionized water | 1177.1 |

*Lactic acid concentration at 88% under aqueous conditions.

Charge 1 was added to a 4-necked flask fitted with a thermocouple, nitrogen sparge, and a mechanical stirrer. Under an N₂ blanket and agitation, the flask was heated to reflux. Charges 2 and 3 were added dropwise from an addition funnel over 150 minutes followed by a 30 minute hold. After increasing the temperature to 120° C., Charge 4 was subsequently added over 15 minutes followed by a 10 minute hold. The temperature was decreased to 90° C. while adding Charge 5 to help cool the reaction. Charge 6 was added and held for 3 hours at 85° C. During the hold, Charge 7 was heated to approximately 35-40° C. in a separate container outfitted with a mechanical stirrer. After the hold, the contents from the reactor were dispersed into Charge 7 under rapid agitation, then held for 60 minutes. Charge 8 was added under agitation as the dispersant continued to cool to ambient temperature.

The polymeric dispersant had a solids percent of 17.0%. GPC analyses to determine polymer Z average molecular weight showed a value of 620,000 and was done with DMF using polystyrene standards.

Example 3

Synthesis of (Meth)Acrylic Polymer in Presence of Polymeric Dispersant of Example 2

| Charge | Ingredient | Weight (in grams) |
|---|---|---|
| 1 | Ex. 2 Dispersant | 411.8 |
|   | Deionized water | 477.2 |
| 2 | Ex. 2 Dispersant | 45.7 |
|   | Ethyl acrylate | 87.6 |
|   | Styrene | 93.8 |
|   | Hydroxypropyl methacrylate | 20.9 |
|   | Trimethylolpropane triacrylate | 6.3 |
| 3 | Deionized water | 129.4 |
|   | Hydrogen peroxide (aq. 35%) | 3.2 |
| 4 | Iso-ascorbic acid | 0.6 |
|   | Deionized water | 135.8 |
| 5 | Deionized water | 4.6 |
|   | Hydrogen peroxide (aq. 35%) | 0.09 |
| 6 | Iso-ascorbic acid | 0.09 |
|   | Deionized water | 4.6 |

Charge 1 was added to a 4-necked flask fitted with a thermocouple, nitrogen sparge, and a mechanical stirrer. Under an $N_2$ blanket and rigorous stirring, the flask was heated to 50° C. At 50° C., the solution was sparged under nitrogen for an additional 30 minutes. Charges 2 and 3 were mixed then added to an additional funnel; the solution was continuously agitated using a nitrogen bubbler. Charge 4 was added to a second additional funnel. Both solutions were added over 180 minutes at 50° C., then held for 30 minutes. Charges 5 and 6 were added and held for 30 minutes at 50° C.

GPC analyses to determine polymer Z average molecular weight showed a value of 650,000 and was done with DMF using polystyrene standards. Final particle size yielded a Z-average size of 40 nm.

Example 4 (Comparative)

Formulation of Cationic Electrodepositable Coating Composition Without the Additive of Example 3

| Charge | Ingredient | Weight (in grams) |
|---|---|---|
| 1 | Example 1 | 1004.9 |
| 2 | Example 3 | 0.0 |
| 3 | CP934D[1] | 96.3 |
| 4 | Deionized Water | 1398.8 |
| 5 | E6165[2] | 7.4 |

[1]Blue cationic acrylic paste commercially available from PPG Industries Inc.
[2]Cationic tin catalyst paste commercially available from PPG Industries, Inc.

Charge 1 was added to a one gallon container and diluted with a portion of Charge 4. This was then placed under agitation. Charge 3 was diluted with a portion of Charge 4 and added to the diluted Charge 1. Charge 5 was diluted with a portion of Charge 4 and added to the previous mixture. The remainder of Charge 4 was added.

Example 5

Formulation of Cationic Electrodepositable Coating Composition With the Additive of Example 3

| Charge | Ingredient | Weight (in grams) |
|---|---|---|
| 1 | Example 1 | 1004.9 |
| 2 | Example 3 | 413.6 |
| 3 | CP934D | 115.6 |
| 4 | Deionized Water | 1398.8 |
| 5 | E6165 | 8.7 |

Charge 1 was added to a one gallon container and diluted with a portion of Charge 4. This was then placed under agitation. Charge 2 was diluted with a portion of Charge 4 and added to the diluted Charge 1. Charge 3 was diluted with a portion of Charge 4 and added to the previous mixture. Charge 5 was diluted with a portion of Charge 4 and added to the previous mixture. The remainder of Charge 4 was added.

Example 6 (Comparative)

Formulation of Cationic Electrodepositable Coating Composition Derived from Diglycidyl Ether of Bisphenol A

| Charge | Ingredient | Weight (in grams) |
|---|---|---|
| 1 | CR451A[1] | 870.2 |
| 2 | HALLCOMID M-8-10[2] | 62.5 |
| 3 | CP573B[3] | 122.8 |
| 4 | Deionized Water | 1507 |

[1]Cationic sulfonium salt group-containing resin derived from a diglycidyl ether of bisphenol A and a fully blocked polyisocyanate curing agent commercially available from PPG Industries, Inc.
[2]Film build additive available from Stepan.
[3]Cationic epoxy pigment paste commercially available from PPG Industries, Inc.

Charge 1 was added to a one gallon container and diluted with a portion of Charge 4. This was then placed under agitation. Charge 2 was added to the diluted Charge 1 and allowed to stir for approximately 15 minutes. Charge 3 was diluted with a portion of Charge 4 and added to the previous mixture. The remainder of Charge 4 was added.

Coat Out Conditions for Electrocoat Test Baths and Subsequent Testing of Coated Samples

| Coating Composition | Bath Temp[1] | Voltage | Total Coulombs | Film Build[2] |
|---|---|---|---|---|
| Example 4 | 92 | 300 | 105 | 2.9 |
| Example 5 | 92 | 300 | 105 | 3.1 |
| Example 6 | 92 | 200 | 90 | 2.4 |

[1]Measured in degress Fahrenheit.
[2]Measured in mils.

Preparation of Panels for Corrosion Test

Panels were coated in a plastic tube using a magnetic stir bar for agitation. The bath temperature was controlled using a thermocouple attached to a temperature controller to deliver hot or cold water as required through stainless steel tubing. This tubing also served as the anode for the electrodeposition process. The substrate used for coating was 4"×6"×⅜" cast iron pretreated with a heavy (7-10 gm/m$^2$) zinc phosphate (Gardobond Z3650 from Chemetall). Following coat outs, panels were rinsed and then baked for 10'@170° F. The oven was then turned up to 356° F. and the panels were allowed to bake for an additional 40 minutes.

Corrosion Tasting

Corrosion testing utilized the test described in ASTM B117 (Salt Spray Test). In this test, the coating is cut using a scribing tool with a single vertical line to expose the bare metal substrate. The scribed substrate is placed into a test chamber where an aqueous salt solution is continuously misted onto the substrate. The chamber is maintained at a constant temperature. The coated substrate is exposed to the salt spray environment for 2000 hours. After exposure, the coated substrate is removed from the test chamber and evaluated for corrosion along the scribe. Scribe Creep is the total distance the corrosion has traveled across the scribe measured in millimeters. Surface and edge corrosion are also noted. Tape adhesion is carried out by applying Scotch filament tape to the surface of the coated substrate by pressing down firmly against the coating to eliminate voids and air pockets. Then the tape is sharply pulled off at a right angle to the plane of the coated surface. Adhesion is reported by the amount of coating removed from the substrate.

The testing results are reported in Table I below.

TABLE I

Testing Results

| Coating Composition | Scribe Creep | Surface Corrosion | Edge Corrosion | Tape Adhesion |
|---|---|---|---|---|
| Example 4 | <1 mm/sl. blistering away from scribe | Very heavy | Very heavy | Total coating loss |
| Example 5 | <1 mm/sl. blistering away from scribe | Very slight | Very slight | No coating loss |
| Example 6 | <1 mm/sl. blistering away from scribe | Very slight | Medium - Heavy | No coating loss |

The testing results show that Example 5 which contains the Example 3 component is superior in corrosion resistance to Example 4 which does not. Also, Example 5 has corrosion resistance similar to a cationic electrodeposited resin formulated with an epoxy resin derived from bisphenol A (Example 6), and in addition has superior edge corrosion.

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. A method comprising applying by electrodeposition a coating composition to a segment of cast iron pipe pretreated with zinc phosphate to form a coating thereon and curing the coating, wherein the coating composition comprises:
  a (meth)acrylic polymer dispersed in aqueous dispersion medium prepared by polymerizing in the presence of a cationic salt group containing polymeric dispersant a polymerizable ethylenically unsaturated monomer composition comprising a mixture of ethylenically unsaturated monomers at least one of which contains at least two ethylenically unsaturated groups per molecule and which is free of amido groups;
  (ii) an electrodepositable cationic resinous vehicle containing active hydrogen groups; and
  (iii) a curing agent reactive with the active hydrogen groups;
  and wherein the cured coating has less than 1 millimeter scribe creepage after exposure to a salt spray environment for 2000 hours in accordance with ASTM B117 and in which the cured coating exhibits no coating loss when subject to Tape Adhesion Testing.

2. The method of claim 1 in which the segment is a segment of pipe joining two linear sections of pipe.

3. The method of claim 2 in which the segment is non-linear.

4. The method of claim 3 in which the segment is elbow shape.

5. The method of claim 1 in which the monomer containing at least two ethylenically unsaturated monomers comprises a poly(meth)acrylate.

6. The method of claim 5 in which the poly(meth)acrylate comprises a tri- and/or tetra(meth)acrylate.

7. The method of claim 1 in which the mixture of ethylenically unsaturated monomers comprises a (meth)acrylic monomer containing active hydrogen groups.

8. The method of claim 1 in which the dispersion medium comprises water, organic solvent and the cationic salt group-containing polymeric dispersant that is different from the electrodepositable cationic resinous vehicle.

9. The method of claim 1 in which the cationic salt group-containing polymeric dispersant comprises a (meth)acrylic resin.

10. The method of claim 9 in which the cationic salt group comprises amine salt groups and/or sulfonium salt groups.

11. The method of claim 1 in which (i) has an Mz of at least 500,000.

12. The method of claim 1 in which (ii) comprises a (meth)acrylic polymer.

13. The method of claim 1 in which (ii) is prepared in organic solvent and inverted into aqueous medium.

14. The method of claim 1 wherein the coating composition is substantially free of bisphenol A and derivatives thereof.

* * * * *